(No Model.)  
G. J. ALTHAM.  
OIL ENGINE.  
3 Sheets—Sheet 1.

No. 564,577. Patented July 21, 1896.

FIG. 1.

FIG. 2.

WITNESSES  
INVENTOR

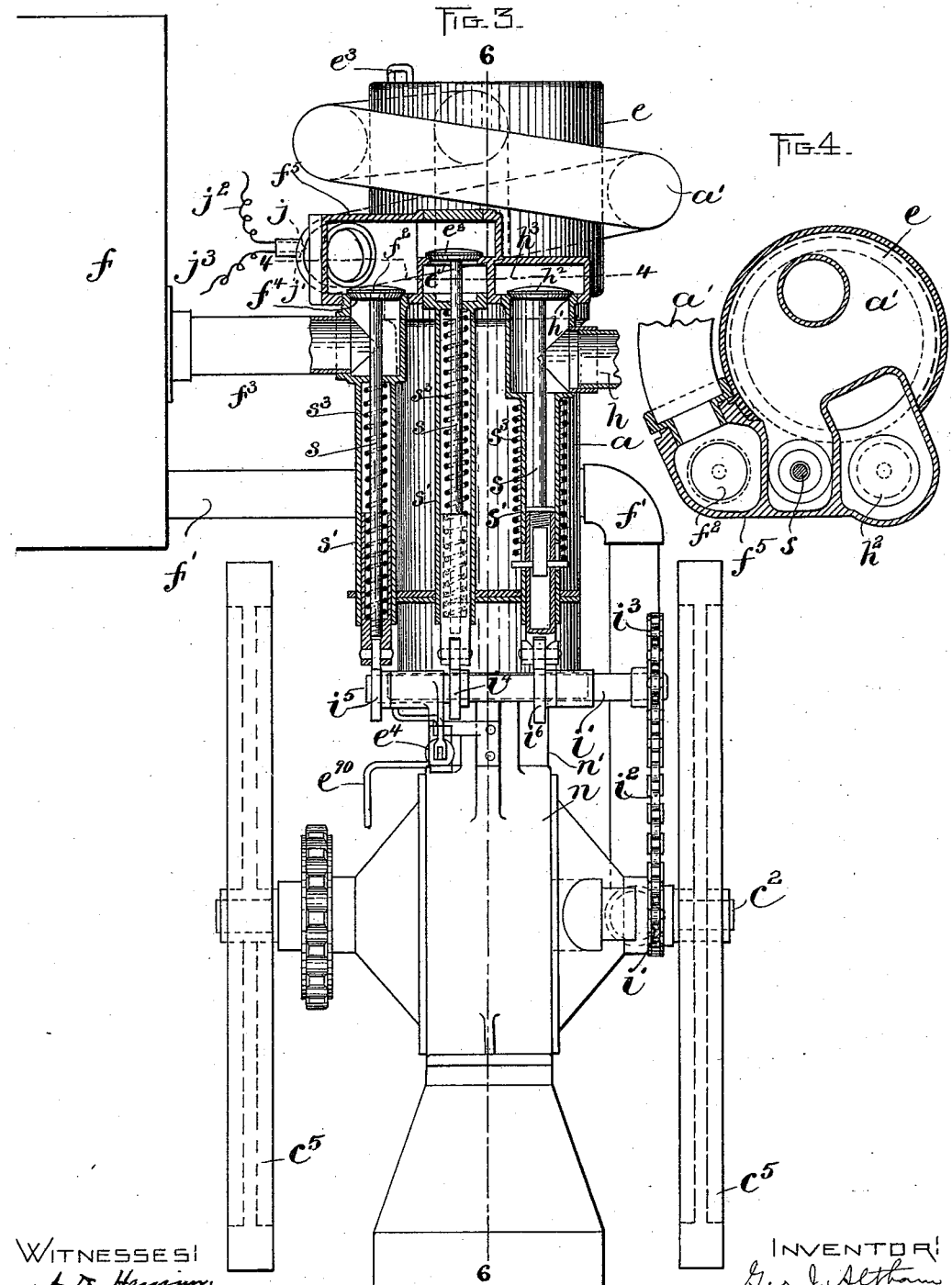

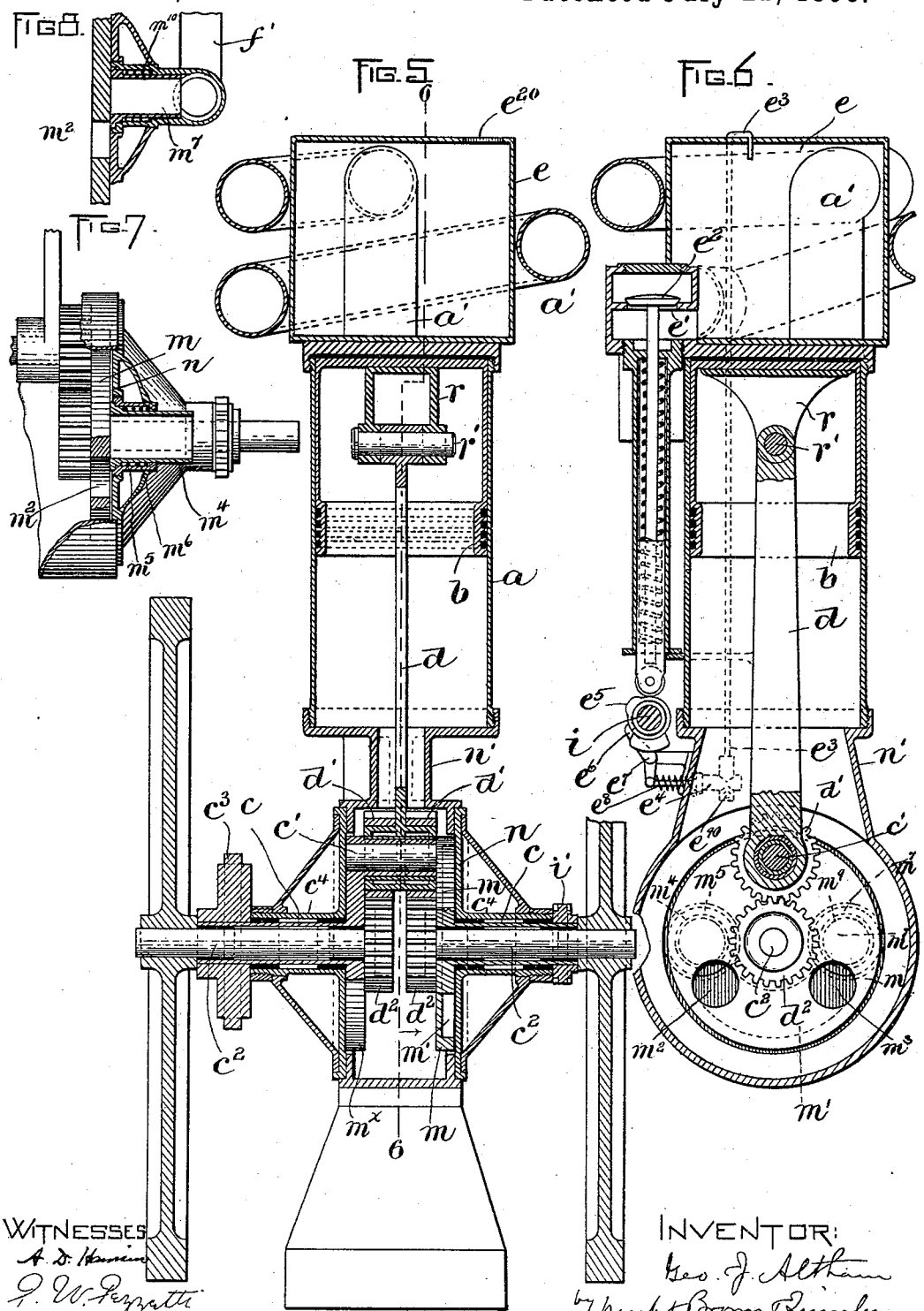

UNITED STATES PATENT OFFICE.

GEORGE J. ALTHAM, OF SWANSEA, MASSACHUSETTS.

OIL-ENGINE.

SPECIFICATION forming part of Letters Patent No. 564,577, dated July 21, 1896.

Application filed May 22, 1896. Serial No. 592,550. (No model.)

*To all whom it may concern:*

Be it known that I, GEORGE J. ALTHAM, of Swansea, in the county of Bristol and State of Massachusetts, have invented certain new and useful Improvements in Oil-Engines, of which the following is a specification.

This invention relates to oil-engines of the four-cycle type, in which the piston is given an impulse by the explosion of a mixture of oil, vapor, and air, hereinafter termed the "working agent," during every alternate forward movement, and has for its object to provide a light and simple engine of this type particularly adapted for use on road-carriages and for other purposes requiring lightness of construction.

The invention consists in the improvement which I will now proceed to describe and claim.

Of the accompanying drawings, forming a part of this specification, Figure 1 represents an end elevation of an oil-engine embodying my invention. Fig. 2 represents a top view of the same. Fig. 3 represents a front elevation partly in section. Fig. 4 represents a section on line 4 4 of Fig. 3. Fig. 5 represents a section on line 5 5 of Fig. 1. Fig. 6 represents a section on line 6 6 of Fig. 3. Fig. 7 represents a section on line 7 7 of Fig. 1. Fig. 8 represents a section on line 8 8 of Fig. 1.

The same letters of reference indicate the same parts in all the figures.

In the drawings, $a$ represents a cylinder, and $b$ a piston working back and forth therein.

$c$ represents the driving-shaft, which is driven by the piston through the connecting-rod $d$, and is provided with power-transmitting means, such as a sprocket-wheel $c^3$, said shaft being made in two tubular sections mounted to rotate in bearings $c^4$ $c^4$, and surrounding the shaft-sections $c^2$ $c^2$, hereinafter described, to which the fly-wheels $c^5$ $c^5$ are attached. The connecting-rod $d$ is jointed to the piston at one end, its other end engaging the crank $c'$, which is secured to the tubular shaft $c$, as hereinafter described.

$a'$ is an elongated combustion-chamber, which communicates at one end with the upper end of the cylinder. The length of said chamber is essentially much greater than its diameter in cross-section, so that when a charge of the working agent is admitted to the outer portion of the said chamber (the portion farthest from the cylinder) a body of air may be contained in the inner portion of the chamber and interposed as an air-cushion between the said charge and the cylinder without mixing to any material extent with the working agent prior to the explosion, the cross-sectional area of the chamber being so small as to prevent the mixture of the working agent and air in the combustion-chamber. The said body of air mingles with the products of combustion that enter the cylinder after the explosion, as hereinafter described, thus reducing the temperature of the said products and keeping the cylinder comparatively cool, a result of much importance.

The capacity of the combustion-chamber is preferably about equal to that of the cylinder, and it is preferably of tubular form; and for the sake of compactness is coiled helically about the vaporizing-chamber $e$, hereinafter described, although this arrangement is not essential and the combustion-chamber may be arranged in any other suitable way.

The vaporizing-chamber $e$ has a continuously-open air-inlet $e^{20}$, Fig. 2, through which external air enters the chamber during the drawing-in stroke of the piston, hereinafter described, and mingles therein with the hydrocarbon vapor to form an explosive mixture or working agent. The vaporizing-chamber communicates with the outer end of the combustion-chamber $a'$ through a port $e'$, controlled by a valve $e^2$, Figs. 3 and 6, and receives oil through a pipe $e^3$, supplied by a pump $e^4$, which may be operated by any suitable means. As here shown, the pump is operated by a cam $e^5$ on a shaft $i$, hereinafter described, a lever $e^6$ pivoted at $e^7$ to a fixed support, said lever being connected with the plunger-rod $e^8$ of the pump, and a spring $e^9$, which holds the lever $e^6$ against the cam $e^5$, so that the lever is oscillated when the shaft $i$ is in motion. The oil is drawn to the pump from a reservoir (not shown) through a pipe $e^{90}$, and is vaporized in the chamber $e$ by the heat generated by the combustion of the mixture or the working agent, as hereinafter described.

For convenience I will term the end of the cylinder which is connected with the combustion-chamber the "front end" and the other the "rear end." The movement of the piston from the front to the rear end is termed the "forward stroke," while the opposite movement is termed the "return stroke," each forward stroke following an explosion being termed a "working stroke."

$f$ represents an air-chamber, which communicates with the rear end of the cylinder through a conduit $f'$, and with the outer end of the combustion-chamber $a'$ through a conduit $f^3$, suitable valves $m$ and $f^2$ being provided, as hereinafter described, the valve $m$ controlling the inlet to said air-chamber, whereby air displaced from the cylinder during the forward strokes of the piston is confined under pressure in the air-chamber, while the other valve $f^2$ controls the outlet of the air-chamber and permits the compressed air to escape therefrom at suitable intervals into the combustion-chamber, air entering the air-chamber during each forward stroke of the piston and escaping therefrom into the combustion-chamber during the return stroke following each working stroke of the piston.

The valve $f^2$ controls a port $f^4$, which connects the conduit $f^3$ with a casing or chamber $f^5$, said casing also communicating with the port $e'$, through which the working agent passes from the vaporizing-chamber; hence the outer end of the combustion-chamber receives air from the air-chamber $f$ and charges of the working agent from the vaporizing-chamber $e$, as hereinafter described.

The valves $e^2$, $f^2$, and $h^2$, controlling the ports at the front end of the cylinder, are closed by springs $s^3$ acting on the stems $s$ of said valves, as shown in Fig. 3, and are opened respectively by cams $i^4$ $i^5$ $i^6$ on a shaft $i$, which is rotated by power imparted from the driving shaft $c$ through suitable connections, such as sprocket-wheels $i'$ $i^3$ and a sprocket-chain $i^2$. The stems of the said valves are located within casings $s'$, and the closing-spring of the exhaust-valve $h^2$ is located on the outside of the casing of the stem of that valve, so that said spring may be kept at a comparatively low temperature by the surrounding air. The springs of the other valves are preferably within the casings.

$jj'$ represent two electrodes projecting into the outer end of the combustion-chamber and forming parts of an electric circuit which includes the wires $j^2 j^3$, Fig. 3, and a suitable source of electricity. Said circuit is provided with suitable means for producing a spark between the electrodes at predetermined periods, the spark exploding a charge of the working agent in the outer end of the combustion-chamber.

The valve $m$, which controls the air-inlet to the air-chamber $f$, also controls an air-passage from the rear end of the cylinder to the external air and permits air to enter the rear end of the cylinder through said passage during each return stroke of the piston, but prevents the escape of air through said passage during the forward strokes of the piston. The said valve $m$ is a disk affixed to one of the sections of the shaft $c$ and rotating therewith. Said disk is inclosed in a casing $n$, and the upper portion of said casing is connected by a passage $n'$ with the rear end of the cylinder, said passage conducting air from the casing $n$ to the rear end of the cylinder during each return stroke of the piston and from said rear end to the casing during each forward stroke of the piston. The passage $n'$ is formed to surround the connecting-rod $d$, as shown in Figs. 5 and 6. In the outer side of the disk $m$ is a segmental port $m'$, from the ends of which extend passages $m^2$ $m^3$, communicating with the passage $n'$.

$m^4$ represents a tube movable endwise in a passage $m^5$ in the casing and pressed by a spring $m^6$ against the outer side of the disk $m$, said tube communicating with the external air and being arranged to connect with the segmental port $m'$ during a part of the rotation of the disk $m$, the arrangement being such that when the piston is making its return stroke the tube $m^4$ and port $m'$ will register, so that air will pass through the said tube, the port $m'$, passages $m^2$ $m^3$, and passage $n'$ into the rear end of the cylinder. At the end of the return stroke the port $m'$ passes away from the tube $m^4$, the latter being closed by the surface of the disk during the forward stroke of the piston.

$m^7$ represents a passage extending from the casing $n$ at the opposite side of the shaft from the tube $m^4$ and communicating with the conduit $f^2$ that supplies air to the air-chamber $f$. In said passage is a tube $m^9$, which is pressed inwardly by a spring $m^{10}$ against the disk $m$, said spring being shown in section in Fig. 8. The tube $m^9$ is arranged to coincide with the segmental port $m'$ during the forward stroke of the piston, so that the air expelled from the cylinder by the piston passes through the passage $n'$, the disk-passages $m^2$ $m^3$, the port $m'$, the tube $m^9$, and the conduit $f^2$ into the air-chamber $f$, the air-inlet tube $m^4$ being at this time closed, as above described. It will be seen, therefore, that the disk $m$ constitutes a positively-operating rotary valve, which connects the rear end of the cylinder with the external air during the return stroke of the piston and with the air-storage chamber during the forward stroke.

The disk $m$ constitutes also a connection between one of the tubular sections of the driving-shaft $c$ and the crank-pin $c'$, the other section of the driving-shaft being connected with said crank-pin by another disk $m^\times$, affixed to the last-named section, the two disks being separated by a space the width of which exceeds the thickness of the piston-rod. The crank-pin $c'$ is affixed rigidly to the disk $m$, and enters a sleeve $c^6$ which is rigidly attached to the disk $m^\times$. Said pin and sleeve constitute a two-part crank-pin of great strength and rigidity, the sleeve $c^6$ being preferably proportioned so that it has about the same strength as the pin $c'$. The driving-shaft $c$ is rotated by the movement of the piston in the usual manner, and imparts motion through the wheel $c^3$ to the mechanism to be driven and through the wheel $i'$ to the valve-operating mechanism above described.

The fly-wheel shaft $c^2$ is, however, rotatable independently of the driving-shaft $c$ and at a more rapid rate, for a purpose hereinafter explained.

The piston-rod is connected with the fly-wheel shaft $c$ by means of gears $d'$ $d'$, affixed rigidly to the lower end of said rod, and gears $d^2$ $d^2$, affixed rigidly to the shaft $c^2$, said shaft being made in two sections, to the adjacent ends of which the gears $d^2$ are affixed, said gears being between the disks $m$ $m^x$ and separated by a space of greater width than the thickness of the rod $d$. The gears $d'$ are caused by the reciprocating movements of the piston to revolve about the gears $d^2$, and as said gears $d'$ do not rotate, but are affixed to the rod $d$, they impart rotary motion to the gears $d^2$ and fly-wheel shaft $c^2$. The gears $d'$ are held in engagement with the gears $d^2$ by means of the crank-pin $c'$ and sleeve $c^6$, which pass through the centers of the gears $d'$.

The gear connections between the piston-rod and fly-wheel shaft enable the fly-wheel to be rotated more rapidly than would be possible by a direct crank connection with the piston-rod. When the gears $d'$ $d^2$ are of the same size, the fly-wheel shaft is given two complete rotations by each forward and return stroke of the piston. By making the gears $d'$ larger than the gears $d^2$ the rapidity of rotation of the fly-wheel shaft can be increased. This multiplication of motion between the piston-rod and shaft increases the momentum of the fly-wheel, and enables a much lighter fly-wheel to be used than would otherwise be possible.

Ordinarily in comparatively small engines the fly-wheel weighs as much or more than the other parts combined, this excess of weight being necessary when the shaft has the usual direct connection with the piston. I have found that by increasing the rapidity of rotation of the shaft and fly-wheel, as above described, it is feasible to employ a much lighter fly-wheel, the reduction in weight being compensated for by the increase of momentum.

The energy or *vis viva* of the fly-wheel increases as the square of the velocity, hence by increasing the velocity of the fly-wheel twice the weight of the fly-wheel can be decreased to one-fourth of the weight that would otherwise be required.

The operation is as follows: After an explosion takes place in the combustion-chamber, causing a working stroke of the piston, said chamber is washed out by a charge of compressed air from the air-chamber, as hereinafter described, and contains nothing but pure air during the forward stroke of the piston following the working stroke, said forward stroke drawing a part of the air into the cylinder, and also drawing into the outer portion of the combustion-chamber a charge of the working agent, at the same time drawing air into the vaporizing-chamber through the inlet $c^{20}$, all as hereinafter described, the charge of the working agent being compressed in the combustion-chamber by the return stroke of the piston preceding the working stroke. Assuming, therefore, that the combustion-chamber is charged with the working agent at its outer portion and with air at its inner portion, and that the piston is at the end of the return stroke preceding a working stroke, the charge is then ignited, and acts through the interposed air in the inner portion of the combustion-chamber to give the piston its working stroke. The explosion forces the air in the inner portion of the combustion-chamber into the cylinder, where it mingles with the heated products of combustion, reducing their temperature and keeping the cylinder comparatively cool. It will be seen, therefore, that the cylinder receives a mixture of the products of combustion and air at a relatively low temperature, so that the cylinder does not become highly heated at any time, but remains at a practically uniform relatively low temperature. I am therefore enabled to dispense with special provisions for cooling the cylinder, such as a water jacket or a ribbed external surface for the rapid radiation of heat. The weight of the cylinder may therefore be very materially reduced as compared with cylinders which require means for cooling. The elongation of the combustion-chamber, whereby the interposition of a body or cushion of air between the charge of working agent and the the cylinder is permitted, enables the cylinder to be constructed without cooling means, and therefore of minimum weight, the air cushion deadening the explosion and preventing the liability of rupturing the walls of the combustion-chamber and of the cylinder even though said walls be comparatively light and thin. The said air cushion also enables several of the other parts of the engine to be made of minimum weight, or lighter than would otherwise be desirable. Among these parts may be mentioned the piston-rod, crank, and the connections between said rod and crank. Just before the end of the working stroke the exhaust-valve $h^2$ is opened, and remains open during the next return stroke, allowing the air and products of combustion to pass from the cylinder to the atmosphere. The air-valve $f^2$ is opened just after the exhaust-valve, and admits air under pressure from the air-chamber to the combustion-chamber during the above-mentioned return stroke, the air washing out and cooling the combustion-chamber. At the end of the return stroke the air and exhaust valves are closed, the combustion-chamber now containing only pure air. The valve $e^2$ is then opened, and remains open during the next forward stroke of the piston, (the forward stroke which alternates with the working stroke,) so that the piston draws air from the inner portion of the combustion-chamber and draws a charge of the working agent into the outer portion of said chamber. At the end of this forward or drawing-in stroke the valve $e^2$ is closed, (all the valves being now closed,) so that during the next return stroke the air and working agent are compressed in the combustion-chamber prior to the next explosion. The operation is thus continued, every alternate forward stroke of the piston being a working stroke.

In another application for Letters Patent of the United States filed by me January 25, 1896, Serial No. 576,771, I have described and claimed an oil-engine comprising a cylinder, a piston working therein, and two independent air-supplying agencies communicating with the front end of the cylinder, one of said agencies including a vaporizing-chamber in which the air becomes a part of the working agent, while the other includes, first, a valved air-supply inlet for the rear end of the cylinder; secondly, an air-storage chamber; thirdly, a valved passage connecting the storage-chamber with the rear end of the cylinder; fourthly, a valved passage connecting the storage-chamber with the front end of the cylinder; and fifthly, means for intermittently opening the last-mentioned passage to supply a cleansing and cooling blast to the cylinder after each working stroke. In the engine shown in this application I have added to the subject-matter of my former application the elongated combustion-chamber which is interposed between the cylinder and the air-chamber, so that the explosion takes place practically outside the cylinder and is cushioned by air, which relieves the strain on both the combustion-chamber and the cylinder.

I prefer to make the piston $b$ hollow and of suitable depth, as shown in Figs. 5 and 6, its lower end being open and forming a chamber which terminates in a head or piston proper at the upper end of the flanged portion. The rod $d$ is connected with the piston by means of a bracket $r$, bolted or otherwise securely affixed to the head portion of the piston, and a pivot $r'$, engaged with said bracket and with the upper end of the rod. By thus connecting the rod with the piston I am enabled to conveniently and economically manufacture the piston by turning out its interior and subsequently securing the bracket thereto, the piston being much lighter and more easily manufactured than one in which ears are formed on the flange portion of the piston as usual.

I claim—

1. An engine of the character specified, comprising a cylinder, a piston therein, an elongated combustion-chamber external to said cylinder and communicating at one end therewith, a valved air-inlet, and a valved working-agent inlet communicating with the opposite end of the combustion-chamber, and positively-operated valve mechanism which connects the said inlets alternately with the combustion-chamber, the air-inlet being opened after each working stroke to supply air to the combustion-chamber, and then positively closed before the opening of the working-agent inlet and until after the next working stroke, whereby the piston is caused to draw a charge of the working agent into the outer end of the combustion-chamber against a cushion of air previously admitted through the air-inlet, said air-cushion being confined between the said charge and the cylinder.

2. An engine of the character specified, comprising a cylinder having a valved exhaust-outlet, a piston in said cylinder, a combustion-chamber having a continuously open connection with the front end of the cylinder, a vaporizing-chamber and an air-storage chamber having valved connections with the combustion-chamber, means for maintaining an effective pressure of air in the air-chamber, means for igniting a charge in the combustion-chamber, and mechanism for intermittently opening the valves controlling the exhaust and the said valved connections.

3. An engine of the character specified, comprising a cylinder, a piston therein, a vaporizing-chamber at one end of the cylinder, an elongated combustion-chamber of helical form coiled about the vaporizing-chamber and communicating at its inner portion with the cylinder, said combustion-chamber being of substantially the same capacity as the cylinder, an air-storage chamber, and a valve mechanism for connecting the outer portion of the combustion-chamber alternately with the air-chamber and the vaporizing-chamber.

4. The combination of a cylinder, a reciprocating piston therein, a tubular driving-shaft, a piston-rod directly connected with the driving-shaft, a fly-wheel shaft within the driving-shaft and rotatable independently thereof, and a motion-multiplying connection between the piston-rod and fly-wheel shaft.

5. The combination of a cylinder, a reciprocating piston therein, a piston-rod, a tubular driving-shaft having a crank connected with the piston-rod, a fly-wheel shaft rotatable independently of the driving-shaft, a gear affixed to the fly-wheel shaft, and a gear affixed to the rod and meshing with the gear on the fly-wheel shaft.

6. An engine of the character specified, comprising a cylinder; a piston therein; an air-chamber having an inlet communicating with the rear end of the cylinder, and an outlet communicating with the front end of the cylinder; an independent air-supply inlet communicating with the rear end of the cylinder; a rod pivoted to the piston, a driving-shaft having a crank connected with said rod; a valve affixed to said shaft and controlling the air-inlets of the cylinder and air-chamber; a fly-wheel shaft rotatable independently of the driving-shaft; and intermeshing gears affixed respectively to the rod and fly-wheel shaft.

In testimony whereof I have signed my name to this specification, in the presence of two subscribing witnesses; this 10th day of April, A. D. 1896.

GEORGE J. ALTHAM.

Witnesses:
   WM. W. COE,
   C. F. BROWN.